(12) United States Patent
Tanaka et al.

(10) Patent No.: US 7,351,456 B2
(45) Date of Patent: Apr. 1, 2008

(54) PRESSURE-SENSITIVE ADHESIVE SHEET ROLL MADE WITH RECYCLED COMPONENTS OF THE PRESSURE-SENSITIVE ADHESIVE

(75) Inventors: Naomitsu Tanaka, Ibaraki (JP); Yoshihisa Yonemori, Ibaraki (JP); Masakazu Yamane, Ibaraki (JP); Shigeo Yoshihi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 29 days.

(21) Appl. No.: 10/879,210

(22) Filed: Jun. 30, 2004

(65) Prior Publication Data

US 2005/0003130 A1 Jan. 6, 2005

(30) Foreign Application Priority Data

Jul. 1, 2003 (JP) .............................. 2003-189822

(51) Int. Cl.
- *B32B 7/12* (2006.01)
- *B32B 15/04* (2006.01)
- *B32B 33/00* (2006.01)
- *A47L 25/00* (2006.01)

(52) U.S. Cl. .................. 428/40.1; 428/343; 15/104.002

(58) Field of Classification Search ............... 428/40.1, 428/343; 242/159–178; 206/411, 389; 15/104.002
See application file for complete search history.

(56) References Cited

U.S. PATENT DOCUMENTS 6,589,648 B1 * 7/2003 Schurig ...................... 428/343
2004/0105975 A1 * 6/2004 Vulpitta et al. ............. 428/343

FOREIGN PATENT DOCUMENTS

| DE | 42 21 681 A1 | 1/1994 |
| JP | 7-80838 A | 3/1995 |
| JP | 9-286961 A | 11/1997 |
| JP | 2002-46944 A | 2/2002 |

* cited by examiner

*Primary Examiner*—Patricia L. Nordmeyer
(74) *Attorney, Agent, or Firm*—Birch, Stewart, Kolasch & Birch, LLP

(57) ABSTRACT

A pressure-sensitive adhesive sheet roll includes a core and a pressure-sensitive adhesive sheet being wound around the core, wherein the core and the pressure-sensitive adhesive sheet contain one or more substantially identical components. The pressure-sensitive adhesive sheet may include a base material and a pressure-sensitive adhesive layer. The base material may contain a plastic resin. The pressure-sensitive adhesive sheet may be a removable pressure-sensitive adhesive sheet. The core can be formed from one or more materials derived from a waste of the pressure-sensitive adhesive sheet roll. As the waste, at least one selected from wastes by-produced in production processes of the pressure-sensitive adhesive sheet roll, used pressure-sensitive adhesive sheets and used cores may be used.

5 Claims, 1 Drawing Sheet

PRESSURE-SENSITIVE ADHESIVE SHEET ROLL MADE WITH RECYCLED COMPONENTS OF THE PRESSURE-SENSITIVE ADHESIVE

This Nonprovisional application claims priority under 35 U.S.C. § 119(a) on Patent Application No(s). 2003-189822 filed in Japan on Jul. 1, 2003, the entire contents of which are hereby incorporated by reference.

BACKGROUND OF THE INVENTION

1. Field of the Invention

The present invention relates to a core around which a pressure-sensitive adhesive sheet is to be wound, a pressure-sensitive adhesive sheet roll, their production and a system for recycling the pressure-sensitive adhesive sheet roll.

2. Description of the Related Art

Wastes are by-produced in the manufacture of pressure-sensitive adhesive sheet rolls comprising a core and a pressure-sensitive adhesive sheet such as a tape, sheet or film wound around the core. In addition, the product pressure-sensitive adhesive sheets and cores become wastes after use. Such wastes must be treated. For example, a pressure-sensitive adhesive sheet comprising an overwide pressure-sensitive adhesive is wound and then cut to a specific width to yield a product pressure-sensitive adhesive sheet roll. In this case, both ends (edges) of the pressure-sensitive adhesive sheet roll become wastes. Portions of pressure-sensitive adhesive sheets which cannot be used as products also become wastes in switching of products or at early stages of operation until stable production starts.

Certain pressure-sensitive adhesive sheets are used for the surface protection of coatings typically against damage, blur or decoloring due to the attachment of suspended matter such as dust or collision of, for example, rain drops or fine stones during long-distance transit of coated automobiles and parts thereof by truck or ship. Such pressure-sensitive adhesive sheets are also used for the surface protection typically of stainless plates, aluminum plates, coated plates, resin plates and decorative sheets during storage, transit or press working. In the case of removable pressure-sensitive adhesive sheets such as masking sheets or pressure-sensitive adhesive sheets for semiconductors, cores become wastes when the pressure-sensitive adhesive sheets are applied and are then peeled off after use (after their object has been achieved) and become large amounts of wastes. Most wastes derived from such pressure-sensitive adhesive sheet rolls are incinerated, and only a part of them is recycled as a heat source (thermal recycling).

Waste disposal must be reduced and resources must be effectively utilized from the viewpoint of the environmental issues. Thus, materials must be recycled. However, such pressure-sensitive adhesive sheets each comprise a base sheet (base material) made of a variety of materials, a pressure-sensitive adhesive layer made of a variety of materials arranged on the base sheet, and a core made of paper or a plastic. These materials cannot be significantly recovered and reused separately. As a possible solution to this problem, Japanese Unexamined Patent Application Publication No. 07-80838 (claims and paragraph [0011]) discloses the reuse of edges of a pressure-sensitive adhesive sheet by pulverizing the edges, compressing or heat-compressing the pulverized article to yield a floor material or cushioning material. However, according to this technique, not all but only a part of the waste is reused, the reused molded article is not a pressure-sensitive adhesive sheet and is not recycled in exact meaning. Japanese Unexamined Patent Application Publication No. 2002-46944 (claims) discloses a recycling system for recovering and reusing a core of a wrap film. However, this publication fails to teach recovering and reusing a used film.

In Japan, Industrial Waste Wide-Area Recycle Designation Scheme has been established (see the website of Ministry of the Environment of Japan; URL: http://www.env.go.jp/recycle/waste/saisei/seido.html (in Japanese). This scheme is established to promote recovery and recycle of industrial wastes. This is a scheme in which the Minister of the Environment of Japan designates an organization which is proven to be capable of appropriately collect and recycle industrial wastes generated in wide area to thereby promote collection, transportation or treatment of industrial wastes. However, when such an organization intends to recover and recycle wastes of the pressure-sensitive adhesive sheet rolls according to this scheme, the wastes are difficult to recycle and remanufacture pressure-sensitive adhesive sheet rolls because of the complex structures of the pressure-sensitive adhesive sheet rolls. Thus, the resources are not effectively utilized.

SUMMARY OF THE INVENTION

Accordingly, an object of the present invention is to provide a core and a pressure-sensitive adhesive sheet roll which enables recycling of materials of the pressure-sensitive adhesive sheet roll. Another object of the present invention is to provide methods for manufacturing them. Yet another object of the present invention is to provide a material recycling system in which the pressure-sensitive adhesive sheet roll is put into circulation, the resulting waste is recovered and a pressure-sensitive adhesive sheet roll is remanufactured therefrom.

After intensive investigations to achieve the above objects, the present inventors have found that materials for a pressure-sensitive adhesive sheet roll can be easily recycled by forming a pressure-sensitive adhesive sheet and a core constituting the pressure-sensitive adhesive sheet roll from one or more substantially identical components. The present invention has been accomplished based on these findings.

Specifically, the present invention provides, in a first aspect, a pressure-sensitive adhesive sheet roll including a core and a pressure-sensitive adhesive sheet being wound around the core, wherein the core and the pressure-sensitive adhesive sheet contain one or more substantially identical components.

The pressure-sensitive adhesive sheet may include a base material and a pressure-sensitive adhesive layer. The base material may include a plastic resin. The pressure-sensitive adhesive sheet may be a removable pressure-sensitive adhesive sheet. The core can be formed from one or more materials derived from a waste of the pressure-sensitive adhesive sheet roll. As the waste of the pressure-sensitive adhesive sheet roll, at least one selected from wastes resulting in production processes of the pressure-sensitive adhesive sheet roll, used pressure-sensitive adhesive sheets and used cores may be used.

The present invention further provides, in a second aspect, a method for manufacturing a pressure-sensitive adhesive sheet roll, including the step of winding a pressure-sensitive adhesive sheet around a core, the pressure-sensitive adhesive sheet and the core containing one or more substantially identical components.

According to the pressure-sensitive adhesive sheet roll and method for manufacturing the same, the pressure-sensitive adhesive sheet and the core contain substantially identical components, and edges and goods in process by-produced in the manufacture of the pressure-sensitive adhesive sheet roll, used pressure-sensitive adhesive sheet and core can thereby be reused and recycled as a starting material for a new core. Thus, materials for the pressure-sensitive adhesive sheet roll can be easily recycled.

The present invention provides, in a third aspect, a core for the formation of a pressure-sensitive adhesive sheet roll, being derived from a waste of a pressure-sensitive adhesive sheet roll.

The present invention also provides, in a fourth aspect, a method for manufacturing a core for the formation of a pressure-sensitive adhesive sheet roll, including the steps of pulverizing a waste of a pressure-sensitive adhesive sheet roll, heating and molding the pulverized article. According to the core and the method for manufacturing the same, the core is made from materials derived from wastes of the pressure-sensitive adhesive sheet roll, and thus, materials for the pressure-sensitive adhesive sheet roll can be easily recycled.

The present invention relates to a method for recycling a pressure-sensitive adhesive sheet roll, including the steps of putting the pressure-sensitive adhesive sheet roll into circulation, remanufacturing a core from a waste of the pressure-sensitive adhesive sheet roll; and winding a pressure-sensitive adhesive sheet around the core to thereby manufacture a new piece of the pressure-sensitive adhesive sheet roll.

In addition, the present invention relates to a system for recycling a pressure-sensitive adhesive sheet roll, including a device for putting the pressure-sensitive adhesive sheet roll into circulation, a device for manufacturing a core from a waste of the pressure-sensitive adhesive sheet roll, and a device for winding a pressure-sensitive adhesive sheet around the core to thereby manufacture a new piece of the pressure-sensitive adhesive sheet roll.

According to the method and system for recycling a pressure-sensitive adhesive sheet roll, wastes of the pressure-sensitive adhesive sheet roll distributed on the market are remanufactured into a core, and a pressure-sensitive adhesive sheet is wound around the core to thereby manufacture a new pressure-sensitive adhesive sheet roll. Thus, materials for the pressure-sensitive adhesive sheet roll can be easily recycled.

Further objects, features and advantages of the present invention will become apparent from the following description of the preferred embodiments with reference to the attached drawing.

DESCRIPTION OF THE PREFERRED EMBODIMENTS

Figure 1:
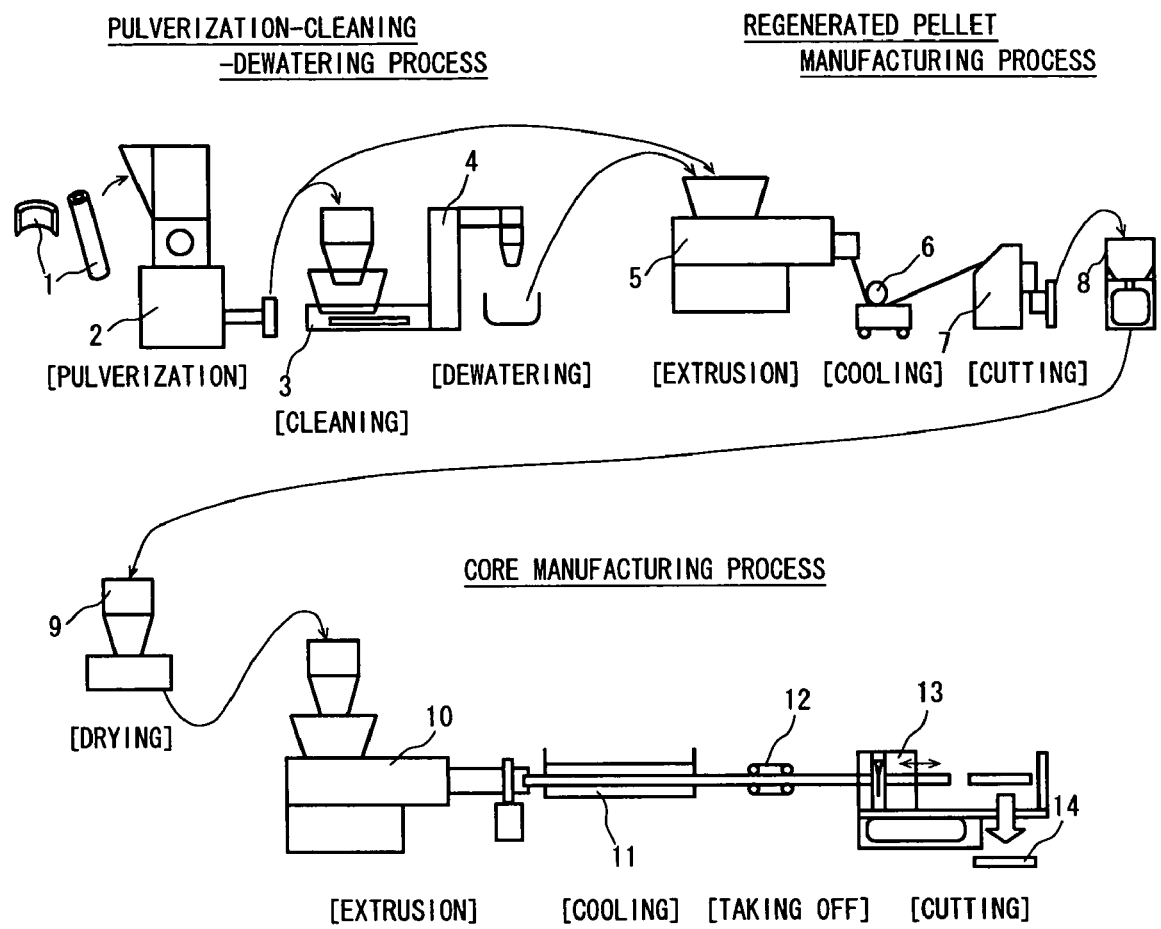
FIG. 1 is a schematic process chart illustrating a method for manufacturing a core as an embodiment of the present invention.

The pressure-sensitive adhesive sheet roll of the present invention comprises a core and a pressure-sensitive adhesive sheet, in which the core and the pressure-sensitive adhesive sheet comprise one or more substantially identical components. By constituting the core and the pressure-sensitive adhesive sheet from the one or more substantially identical components, there is no need of separating the pressure-sensitive adhesive sheet from the core, and these can be easily recycled. The phrase "the core and the pressure-sensitive adhesive sheet comprise one or more substantially identical components" means that one or more main components constituting the pressure-sensitive adhesive sheet are identical to one or more main components constituting the core, and the difference in content of the respective main components between the pressure-sensitive adhesive sheet and the core is 25 percent by weight or less, preferably 15 percent by weight or less, and more preferably 10 percent by weight or less. The "main component" means a component contained in the entire pressure-sensitive adhesive sheet (or the entire core) in an amount of, for example, 10 percent by weight or more, and preferably 5 percent by weight or more. Examples of the main components constituting the pressure-sensitive adhesive sheet are materials such as a base polymer constituting a pressure-sensitive adhesive of the pressure-sensitive adhesive layer or a resin constituting the base material.

The pressure-sensitive adhesive sheet for use in the present invention can be any suitable one. Such a pressure-sensitive adhesive sheet generally comprises a base material (carrier or support) and a pressure-sensitive adhesive layer. Examples of materials for the base material are paper such as Japanese paper and kraft paper; fabrics such as cotton and spun rayon fabrics; nonwoven fabrics such as polyester nonwoven fabrics and poly(vinyl alcohol) (vinylon) non-woven fabrics; and plastic resins. Examples of such plastic resins include cellophane; polyolefin resins such as polyethylenes, polypropylenes, ethylene-propylene copolymers, blends or mixtures of polyethylene and polypropylene, and ethylene-vinyl acetate copolymers; polyester resins such as poly(ethylene terephthalate)s; poly(vinyl chloride)s; acetate resins; polystyrene resins such as polystyrenes; and polyacrylonitriles. A film or foam exhibiting rubber-like elasticity can also be used as the base material. According to the present invention, the base material preferably comprises one or more plastic resins, because such plastic resins effectively work as a component for constituting the core. Among them, polyolefin resins such as polyethylenes, polypropylenes, ethylene-propylene copolymers, blends or mixtures of polyethylene and polypropylene, and ethylene-vinyl acetate copolymers, as well as poly(vinyl chloride)s are typically preferably used.

The thickness of the base material can be set according to the type and use of the materials constituting the base material and is generally 300 µm or less, for example, from about 5 to about 300 µm, and preferably from about 10 to about 100 µm. The base material may have been subjected to any pretreatment such as primer coating, sealing, corona treatment, back coating and/or antistatic treatment.

The pressure-sensitive adhesive constituting the pressure-sensitive adhesive layer is not specifically limited and can be any suitable one. Examples of such pressure-sensitive adhesives are acrylic pressure-sensitive adhesives; rubber pressure-sensitive adhesives such as naturally occurring rubber, regenerated rubber, butyl rubber (isobutylene-isoprene rubber), styrene-butadiene, styrene-isoprene, styrene-ethylene-butylene, and ethylene-vinyl acetate pressure-sensitive adhesives; and silicone pressure-sensitive adhesives.

The pressure-sensitive adhesive may further comprise one or more additives according to necessity, in addition to the base polymer as a main component. Examples of such additives are regular compounding ingredients such as tackifiers, softening agents, fillers, pigments, antiaging agents and stabilizers, as well as silicone oils and low-molecular-weight acrylic polymers. When the pressure-sensitive adhesive sheet is used as a surface protective sheet, especially one for surface protection of automobiles, the use of such a silicone oil and/or low-molecular-weight acrylic polymer is effective for preventing deformation of the coating, because it prevents increased adhesion of the pressure-sensitive adhesive with an elevating temperature.

The present invention significantly exhibits its advantages typically in removable pressure-sensitive adhesive sheets such as pressure-sensitive adhesive sheets for surface protection or those for semiconductors. Specifically, when regular pressure-sensitive adhesive sheets are applied to adherends, they are distributed as a part of the adherend products and usually cannot be efficiently recovered as wastes after use. In contrast, removable pressure-sensitive adhesive sheets are peeled off in site after their object such as surface protection or masking has been achieved, and can thereby be easily recovered.

The core for use in the pressure-sensitive adhesive sheet roll of the present invention can be any one that comprise one or more substantially identical components to those of the pressure-sensitive adhesive sheet. Such a core can be manufactured (remanufactured) by pulverizing a pressure-sensitive adhesive sheet (unused pressure-sensitive adhesive sheet) of the same type as the pressure-sensitive adhesive sheet which is to be wound around the core, and heating and molding the pulverized article or by pulverizing, heating and molding a waste of the pressure-sensitive adhesive sheet roll. Wastes of the pressure-sensitive adhesive sheet roll include wastes, such as edges and goods in process, by-produced in the manufacture of the pressure-sensitive adhesive sheet roll (including manufacture of the pressure-sensitive adhesive sheet and core); used pressure-sensitive adhesive sheets derived from the pressure-sensitive adhesive sheet roll, such as pressure-sensitive adhesive sheets peeled off from the adherends; used cores derived from the pressure-sensitive adhesive sheet rolls, such as cores after the use of the pressure-sensitive adhesive sheet; and unsold goods of pressure-sensitive adhesive sheet rolls. Each of these wastes and unused pressure-sensitive adhesive sheets can be used alone or in combination as the material.

FIG. 1 is a schematic process chart illustrating an embodiment of the method for manufacturing a core according to the present invention. In this embodiment, the core is manufactured through a dry pulverization-cleaning-dehydration process (A), a regenerated pellet manufacturing process (B) and a core manufacturing process (C).

Dry Pulverization-Cleaning-Dehydration Process (A)

The dry pulverization-cleaning-dehydration process (A) is a process for manufacturing a pulverized material that can be charged into an extruder used in the successive regenerated pellet manufacturing process (B). In the process, a waste 1 is pulverized to an appropriate size by a pulverizer 2. Examples of the waste 1 are wastes and edges of pressure-sensitive adhesive sheets formed in the manufacture of pressure-sensitive adhesive sheet rolls, and used pressure-sensitive adhesive sheets and cores recovered from the market. The waste 1 can be pulverized according to any suitable procedure such as physical cutting with a regular rotary blade. If the waste 1 carries dust or foreign matter, the pulverized waste is washed with water using a cleaner 2 and dewatered with a dewatering device 4. The pulverization and cleaning procedures can be carried out in different steps or in one step. Thus, pulverized pieces having a diameter of generally about 2 to about 20 mm and preferably about 2 to about 10 mm are obtained.

Regenerated Pellet Manufacturing Process (B)

The regenerated pellet manufacturing process (B) is a process for manufacturing pellets having homogenous particle sizes to be charged into an extruder used in the successive core manufacturing process (C). Although it is possible to directly heating and molding a waste of pressure-sensitive adhesive sheet or a pulverized article thereof, such a material cannot be stably supplied because of blocking between pressure-sensitive adhesive sheets or due to uneven sizes thereof, and cores having stable quality may not be obtained. By carrying out the regenerated pellet manufacturing process (B) and pelletizing all the material (waste) to thereby allow the pellets having a uniform composition and size, the successive core manufacturing process (C) can be stably carried out.

In Process (B), the pulverized article prepared in the upstream process is fed to an extruder 5, is fused or melted by heating, is extruded into a sheet or string, is cooled by a cooling device 6, and is cut into a specific size by a cutter 7 to thereby yield pellets. The pellets are stored in a catcher tank 8. The pulverized article is heated and fused in the extruder 5 by the action of shearing heat generated by a screw as well as heat from an electric heater. The heating temperature herein can be set depending on the type of the waste and is generally from about 160° C. to about 220° C., and preferably from about 180° C. to about 200° C. in the case of a waste mainly comprising a polyethylene and/or a polypropylene. The cooling device can be any suitable cooling device such as one generally used in extrusion molding. The prepared pellets can have any shape such as a cubic, rectangular parallelepiped, spherical or cylindrical shape of any size. In general, they are about 1- to 10-mm square, and preferably about 1- to 5-mm square pellets.

Core Manufacturing Process (C)

The core manufacturing process (C) is a process for manufacturing a cylindrical core using a pipe extruder. More specifically, the pellets prepared in the upstream process are dried in a drier 9 according to necessity, fed to an extruder 10, heated and fused, extruded into a cylinder, cooled by a cooling device 11, taken off by a take-off device 12 and cut to a specific length by a cutter 13 to thereby yield a cylindrical core 14. The pellets are heated and fused in the extruder 10 by the action of shearing heat generated by a screw as well as heat from an electric heater. The heating temperature herein can be set depending on the type of the waste and is generally from about 160° C. to about 220° C., and preferably from about 180° C. to about 200° C. in the case of a waste mainly comprising a polyethylene and/or a polypropylene. The cooling device can be any suitable cooling device such as one generally used in extrusion molding. The core can have any suitable dimensions. In the case of a regular core, it has an inner diameter of about 10 to about 100 mm and preferably about 20 to about 80 mm (e.g., 76.5 mm), a thickness (difference between the inner diameter and outer diameter) of about 3 to about 20 mm, preferably about 4 to about 15 mm, and more preferably about 4 to about 10 mm, and a length of generally about 200 to about 2300 mm.

The manufactured core should have such a rigidity as to stands winding pressure for winding the pressure-sensitive adhesive sheet therearound and should preferably have a maximum flexural strength of 2 N or more (generally 100 N or less). The maximum flexural strength herein is determined by cutting a sample core to a width of 50 mm, placing the cut core on a horizontal plane so that the peripheral plane of the core is in contact (in linear contact) with the horizontal plane, and determining the maximum flexural strength while pressing the sample core at a rate of 300 mm/min using a Tensilon compression tester available from Orientech Co. If the core has a maximum flexural strength less than 2 N, it may deform when the pressure-sensitive adhesive sheet is wound therearound. The core generally has a maximum flexural strength of about 2 to about 25 N when it has a thickness of 4 mm and an inner diameter of 76.5 mm, and of about 7 to 75 N when it has a thickness of 7 mm and an inner diameter of 76.5 mm. However, the maximum flexural strength of the core is not specifically limited.

The pressure-sensitive adhesive sheet roll of the present invention can be manufactured by winding the pressure-sensitive adhesive sheet around the core comprising one or more substantially identical components to the pressure-sensitive adhesive sheet. The sheet can be wound around the core according to any procedure. For example, it can be wound by inserting and fixing the core into a mandrel of a manufacturing machine for pressure-sensitive adhesive sheet rolls, winding the pressure-sensitive adhesive sheet around the outer periphery of the core by the action of the mandrel to yield a wound article, cutting both edges of the wound article or further cutting the same to a specific width such as 10 to 50 mm to thereby yield the pressure-sensitive adhesive sheet roll.

The method for recycling a pressure-sensitive adhesive sheet roll of the present invention comprises the steps of putting the pressure-sensitive adhesive sheet roll into circulation, remanufacturing a core from a waste of the pressure-sensitive adhesive sheet roll, and winding a pressure-sensitive adhesive sheet around the core to thereby remanufacture a new piece of the pressure-sensitive adhesive sheet roll. The system for recycling a pressure-sensitive adhesive sheet roll comprises means for putting the pressure-sensitive adhesive sheet roll into circulation, means for remanufacturing a core from a waste of the pressure-sensitive adhesive sheet roll, and means for manufacturing a pressure-sensitive adhesive sheet roll by winding a pressure-sensitive adhesive sheet around the remanufactured core. The means for putting the pressure-sensitive adhesive sheet roll into circulation can be any suitable one. As the waste of the pressure-sensitive adhesive sheet roll, those mentioned above can be used. The process and means for remanufacturing the core, and the process and means for manufacturing the pressure-sensitive adhesive sheet roll can be any process and means as mentioned in the methods for manufacturing the core and the pressure-sensitive adhesive sheet. The recycling system will be illustrated below, by taking a pressure-sensitive adhesive sheet for protection of automobiles (hereinafter briefly referred to as "automobile-protective pressure-sensitive adhesive sheet").

Initially, a roll of automobile-protection pressure-sensitive adhesive sheet as the pressure-sensitive adhesive sheet roll of the present invention is transported from a manufacturing plant for pressure-sensitive adhesive sheet roll to an automotive factory, thus putting the same into circulation. The automobile-protective pressure-sensitive adhesive sheet is attached to a surface of an automobile body in order to prevent the automobile from damage, blur or decoloring due to attachment of suspended matter such as dust or collision of, for example, rain drops or fine stones during long-distance transit of coated automobiles and parts thereof by truck or ship. At the time when its object, i.e., protection is achieved, the pressure-sensitive adhesive sheet is peeled off from the automobile. Thus, cores and used pressure-sensitive adhesive sheets (surface protective sheets) are accumulated as wastes by the customer.

The accumulated wastes are recovered. The wastes can be efficiently recovered by loading them into a return cargo of a transportation which has transported the pressure-sensitive adhesive sheet rolls to the automobile factory or into a return cargo from a dealer. The wastes recovered or collected from the automobile factory are fed to a recovering process together with wastes by-produced in the manufacture of the pressure-sensitive adhesive sheet roll. In the recovering process, a core is remanufactured (recycled) from these wastes as a material. By winding the surface protection pressure-sensitive adhesive sheet around the remanufactured core, a pressure-sensitive adhesive sheet roll is manufactured and can be distributed into the market.

According to the recycling method and system of the present invention, the pressure-sensitive adhesive sheet and the core comprise substantially identical components, require no separation for recycling, and can be easily recycled or remanufactured. Thus, wastes derived from the pressure-sensitive adhesive sheet rolls can be recycled and reused into pressure-sensitive adhesive sheet rolls.

The present invention will be illustrated in further detail with reference to several examples below, which are not intended to limit the scope of the invention.

EXAMPLE 1

An automobile-protective pressure-sensitive adhesive sheet was manufactured by applying a solution of polyisobutylene having a viscosity-average molecular weight of $1\times10^6$ in toluene to one side of a film made of polypropylene and polyethylene (weight ratio: 8/2) 40 μm thick, drying the applied film at 100° C. for 3 minutes to thereby form a pressure-sensitive adhesive layer 14 μm thick thereon. A waste of the pressure-sensitive adhesive sheet by-produced in the manufacture was pulverized, heated and molded to yield a cylindrical core having an inner diameter of 76.5 mm and a thickness of 4 mm. The core exhibited a maximum flexural strength of 2.5 N. The pressure-sensitive adhesive sheet was wound around the core to yield a pressure-sensitive adhesive sheet roll.

EXAMPLE 2

The pressure-sensitive adhesive sheet roll manufactured in Example 1 was unwound and applied to a surface of an automobile body for the protection of its coating. The pressure-sensitive adhesive sheet was then peeled off and recovered with the used core, mixed with wastes by-produced in the manufacture of the pressure-sensitive adhesive sheet, pulverized, heated and molded again to remanufacture a core having the same size as that in Example 1. The core had a good appearance as in the core manufactured in Example 1 and exhibited a maximum flexural strength of 2.7 N.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A core for the formation of a pressure-sensitive adhesive sheet roll, being derived from a waste of a pressure-sensitive adhesive sheet roll, and having a maximum flexural strength of 2 N or more, wherein at least 10 wt % of the core is the main components constituting a pressure-sensitive adhesive from the waste of the pressure-sensitive adhesive sheet roll.

2. A pressure-sensitive adhesive sheet roll comprising a core and a pressure-sensitive adhesive sheet being wound around the core, wherein the core is formed from a waste of a pressure-sensitive adhesive sheet roll, wherein the core is a cylindrical core, has a maximum flexural strength of 2 N or more, wherein more than one main components constituting the pressure-sensitive adhesive sheet are identical to more than one main components constituting the core, and both of the main components constituting the base material of the pressure-sensitive adhesive sheet and the main components constituting a pressure-sensitive adhesive are contained in component constituting the core, and wherein the main components constituting the pressure-sensitive adhesive which are contained in the component constituting the core are present in the core in a concentration of at least 10 wt % based on the weight of the core.

3. The pressure-sensitive adhesive sheet roll according to claim 2, wherein the base material comprises a plastic resin.

4. The pressure-sensitive adhesive sheet roll according to claim 2 or 3, wherein the pressure-sensitive adhesive sheet is a removable pressure-sensitive adhesive sheet.

5. The pressure-sensitive adhesive sheet roll according to claim 2, wherein the waste is at least one selected from the group consisting of wastes resulting in production processes of the pressure-sensitive adhesive sheet roll, used pressure-sensitive adhesive sheets and used cores.

* * * * *